Patented July 19, 1932

1,867,583

UNITED STATES PATENT OFFICE

CHARLES G. MOORE, OF LAKEWOOD, AND MILTON ZUCKER, OF CLEVELAND, OHIO, ASSIGNORS TO THE GLIDDEN COMPANY, OF CLEVELAND, OHIO, A CORPORATION OF OHIO

SYNTHETIC RESIN AND PROCESS OF MAKING

No Drawing. Application filed June 10, 1929. Serial No. 369,916.

Synthetic resins have been known in the art for a number of years. Of these, resins of the polyhydric alcohol-polybasic acid type have been known consequent to the investigations of J. Watson Smith (Journal Soc. Chem. Ind. 1901: 1075). For these, generally phthalic anhydride and glycerol, with a modifying acid, are employed. Of such synthetic resins, the various types offer certain advantages, coupled however with certain disadvantages, and although introduced for usage in liquid coating compositions, drawbacks persist. We have found that phthalic acid-glycerol with modifying acid resins are not satisfactory for spirit varnishes, not having such toughness and elasticity as is desirable, and not being sufficiently waterproof. If high molecular weight acids, such as the acids of the fatty oils, be employed as the modifying acid, the same difficulties persist. If tung oil acids be employed, the lack of water resistance is overcome to some extent, but not a sufficiently large percentage can be incorporated, since it is found that the tung oil acids tend to produce an insoluble gel on heating. In accordance with our present invention however, a highly flexible waterproof resin can be prepared by a suitable modification of the polyhydric alcohol-polybasic acid resins.

In its general aspects, the invention contemplates preparing a polyhydric alcohol-polybasic acid type resin such that the entering constituents react in the presence of a soluble phenolic resin. If the latter exceeds 50 per cent. by weight of mixture, the resultant product is not clear, and for use in a spirit varnish gives a spotty, dull film. Below 50 per cent. however, the product is excellent for spirit varnishes, the film obtained from the dissolved resin being clear and glossy.

For the preparation of the products in accordance with the present improvements, a polyhydric alcohol, as glycerol, polyglycerol, glycol, and the like, together with a polybasic acid, for instance phthalic anhydride, are brought into reaction along with a modifying monobasic acid, particularly an aliphatic or a fatty acid, such as an unsaturated fatty acid of the character derived from drying oils, and in the presence of the phenolic resin. For the latter, there may be employed any of the soluble condensation products of a phenol and aldehyde or ketone, such phenolic resins or phenol alcohols or soluble phenol-condensation products being readily formed by any of the procedures known, and requiring no precise detail description here.

In the preferred form of our invention, we take cresylic acid (or mixed cresols with possibly some phenol) and paraldehyde in equimolar proportions, and heat until reaction takes place and a primary condensation product is formed. 10 parts of this cresol-alcohol, after purification to remove excess cresol, are then added to the reaction mixture comprising 45 parts of phthalic anhydride, 22 parts of glycerol, and 23 parts of linseed oil acids. This reaction mixture is heated at a temperature of about 250° C., preferably in an inert atmosphere, until a test sample shows the desired degree of toughness. This occurs shortly before a critical point is reached wherein the soluble modification goes over into an insoluble form of the resin. We prefer therefore to cool the resin rapidly either by pouring it out of the kettle into a container which may be subjected to cold, or by diluting the molten resin with solvent in the manner of preparation of oleoresinous varnish.

If instead of the glycerol, polyglycerol or glycol be employed, or other fatty acids be substituted for the linseed oil acids, corresponding products may be had. For instance, the use of castor oil acids gives a resin well suited for mixing with lacquer. Thus, within the scope of the invention, products may be prepared which afford in high degree characteristics adaptable to commercial varnish usage, for tough elastic and waterproof films, and with such further qualities as to miscibility in lacquers, etc., as may be desired.

Other modes of applying the principle of the invention may be employed, change being made as regards the details described, provided the steps or constituents stated in any of the following claims, or the equivalent of such, be employed.

We therefore particularly point out and distinctly claim as our invention:—

1. The reaction product of a polyhydric alcohol, an organic polybasic acid, an organic monobasic acid, and a preformed soluble phenolic resin of the type formed from the group of reactants consisting of aldehydes and ketones.

2. The reaction product of a polyhydric alcohol, an organic polybasic acid, a monobasic aliphatic acid, and a preformed soluble phenolic resin of the type formed from the group of reactants consisting of aldehydes and ketones.

3. The reaction product of a polyhydric alcohol, an organic polybasic acid, an unsaturated fatty acid, and a preformed soluble phenolic resin of the type formed from the group of reactants consisting of aldehydes and ketones.

4. The reaction product of a polyhydric alcohol, an organic polybasic acid, a drying oil ftty acid, and a preformed soluble phenolic resin of the type formed from the group of reactants consisting of aldehydes and ketones.

5. The reaction product of a polyhydric alcohol, an organic polybasic acid, linseed oil acids, and a preformed soluble phenolic resin of the type formed from the group of reactants consisting of aldehydes and ketones.

6. The reaction product of a polyhydric alcohol, an organic polybasic acid, an organic monobasic acid, and a preformed soluble cresylic acid-paraldehyde resin.

7. The reaction product of a polyhydric alcohol, an organic polybasic acid, a monobasic aliphatic acid, and a preformed soluble cresylic acid-paraldehyde resin.

8. The reaction product of a polyhydric alcohol, an organic polybasic acid, an unsaturated fatty acid, and a preformed soluble cresylic acid-paraldehyde resin.

9. The reaction product of a polyhydric alcohol, an organic polybasic acid, a drying oil fatty acid, and a preformed soluble cresylic acid-paraldehyde resin.

10. The reaction product of a polyhydric alcohol, an organic polybasic acid, linseed oil acids, and a preformed soluble cresylic acid-paraldehyde resin.

11. A process of the character described, which comprises reacting between a polyhydric alcohol, an organic polybasic acid, and an organic monobasic acid, in the presence of a preformed soluble phenolic resin of the type formed from the group of reactants consisting of aldehydes and ketones.

12. A process of the character described, which comprises reacting between a polyhydric alcohol, an organic polybasic acid, and a monobasic aliphatic acid, in the presence of a preformed soluble phenolic resin of the type formed from the group of reactants consisting of aldehydes and ketones.

13. A process of the character described, which comprises reacting between a polyhydric alcohol, an organic polybasic acid, and an unsaturated fatty acid, in the presence of a preformed soluble phenolic resin of the type formed from the group of reactants consisting of aldehydes and ketones.

14. A process of the character described, which comprises reacting between a polyhydric alcohol, an organic polybasic acid, and a drying oil fatty acid, in the presence of a preformed soluble phenolic resin of the type formed from the group of reactants consisting of aldehydes and ketones.

15. A process of the character described, which comprises reacting between a polyhydric alcohol, an organic polybasic acid, and linseed oil acids, in the presence of a preformed soluble phenolic resin of the type formed from the group of reactants consisting of aldehydes and ketones.

16. A process of the character described, which comprises reacting between a polyhydric alcohol, an organic polybasic acid, and an organic monobasic acid, in the presence of a preformed soluble cresylic acid-paraldehyde resin.

17. A process of the character described, which comprises reacting between a polyhydric alcohol, an organic polybasic acid, and a monobasic aliphatic acid, in the presence of a preformed soluble cresylic acid-paraldehyde resin.

18. A process of the character described, which comprises reacting between a polyhydric alcohol, an organic polybasic acid, and an unsaturated fatty acid, in the presence of a preformed soluble cresylic acid-paraldehyde resin.

19. A process of the character described, which comprises reacting between a polyhydric alcohol, an organic polybasic acid, and a drying oil fatty acid, in the presence of a preformed soluble cresylic acid-paraldehyde resin.

20. A process of the character described, which comprises reacting between a polyhydric alcohol, an organic polybasic acid, and linseed oil acids, in the presence of a preformed soluble cresylic acid-paraldehyde resin.

Signed by us this 7 day of June, 1929.

CHARLES G. MOORE.
MILTON ZUCKER.